United States Patent
Wolfe, Jr. et al.

(10) Patent No.: US 11,246,287 B2
(45) Date of Patent: Feb. 15, 2022

(54) ROTARY DISPENSER

(71) Applicant: Starmark Pet Products, Inc., Hutto, TX (US)

(72) Inventors: Jerry J. Wolfe, Jr., Hutto, TX (US); Harold Keith Benson, Hutto, TX (US)

(73) Assignee: STARMARK PET PRODUCTS, INC., Hutto, TX (US)

( * ) Notice: Subject to any disclaimer, the term of this patent is extended or adjusted under 35 U.S.C. 154(b) by 59 days.

(21) Appl. No.: 16/780,668

(22) Filed: Feb. 3, 2020

(65) Prior Publication Data
US 2021/0235664 A1 Aug. 5, 2021

(51) Int. Cl.
*A01K 5/02* (2006.01)
*A01K 15/02* (2006.01)

(52) U.S. Cl.
CPC ............ *A01K 5/025* (2013.01); *A01K 15/025* (2013.01)

(58) Field of Classification Search
CPC .... A01K 5/025; A01K 15/025; A01K 5/0114; A01K 5/0291; A01K 5/0233; A01K 5/0275; A01K 15/026
See application file for complete search history.

(56) References Cited

U.S. PATENT DOCUMENTS

| | | | |
|---|---|---|---|
| D317,666 S | 6/1991 | Haynes | |
| 5,176,103 A | 1/1993 | Reid et al. | |
| 5,222,461 A | 6/1993 | Haynes | |
| D339,429 S | 9/1993 | Reid et al. | |
| 6,651,840 B1 * | 11/2003 | Van Dullemen | G07F 11/00 221/88 |
| 8,424,489 B2 * | 4/2013 | Desrosiers | A01K 5/01 119/61.54 |
| 2005/0066905 A1 | 3/2005 | Morosin et al. | |
| 2009/0151643 A1 | 6/2009 | Hodgins | |
| 2010/0089327 A1 | 4/2010 | Gross | |
| 2014/0060441 A1 * | 3/2014 | Baxter | A01K 5/02 119/61.5 |
| 2017/0042116 A1 | 2/2017 | Lindskov et al. | |
| 2019/0098864 A1 * | 4/2019 | Simon | A01K 5/01 |

* cited by examiner

*Primary Examiner* — Joshua J Michener
*Assistant Examiner* — Henry Hooper Mudd
(74) *Attorney, Agent, or Firm* — Brian F. Russell

(57) ABSTRACT

A treat dispenser includes a housing having an interior compartment. The housing has an opening formed therein communicating with the compartment. The treat dispenser further includes a turntable within and rotatable with respect to the housing and an actuator coupled to the turntable. The actuator is configured to impart rotation to the turntable based on manipulation of the actuator, such that an animal treat disposed within the compartment and on the turntable is ejected radially from the housing through the opening.

23 Claims, 6 Drawing Sheets

ROTARY DISPENSER

BACKGROUND OF THE INVENTION

The present invention relates in general to dispensers suitable for dispensing food and/or treats, for example, to household pets.

Animal food and/or animal treat dispensers are commonly provided to household pets, such as dogs and cats, to supply nutrition, to promote dental cleaning, to provide healthy physical exercise and mental stimulation, and to reduce destructive behaviors arising from boredom. A number of different pet feeders and treat dispensing pet toys that hold and/or dispense treats have been patented and/or introduced into the pet toy market in recent years.

For example, U.S. Pat. No. 5,176,103 discloses a rotary feeder for animals including a base containing a plurality of food receptacles disposed around the base, an indexable cover rotationally supported by the base and having an opening giving access to each receptacle in turn when the cover is indexed. The rotary feeder further includes a motor drive unit that, when periodically energized, rotates the drive unit and with it the cover so as to index the cover opening in turn from receptacle to receptacle.

U.S. Pat. No. 5,222,461 discloses an animal activated feeder having a base, which supports a central cradle for rotation about a central axis. A circular food bowl having a number of receptacles can be positioned on the cradle to rotate with it, or lifted off for cleaning. The base includes a central spring housing having a flat helical torsion spring (i.e., a "clock spring"), which rotates the cradle and food bowl. Rotation is indexed in increments by a pet activated foot pedal. Indexing is limited to feed one receptacle at a time. Spinning of the food bowl is prevented by a group of lugs projecting from the cradle.

U.S. Pat. No. 8,424,489 discloses a feeding device including a first food-receiving portion within an upper side of a main body. The first food-receiving portion comprises independent first food compartments disposed in axis-symmetrical positions with reference to a central vertical axis. A first cover having at least one access aperture is positioned over the first portion and is supported for free rotation upon actuation by the animal being fed. Independent second food-receiving portions, each comprising two second food compartments separated from one another by a transversal wall, are provided adjacent to the first portion. Each second portion has a corresponding second cover that is in sliding engagement therewith and freely movable upon actuation by the animal being fed. The combination of rotating and sliding covers is said to create stimulating challenges for the animal.

U.S. Patent Publication No. 2005/0066905 A1 discloses an automated pet feeder having a rotatable food bowl including cavities made accessible to a pet at predetermined feeding times. A lid with an opening for exposing one of the cavities is positioned above the bowl. A base unit that supports the bowl is configured to rotate the bowl while the lid remains stationary and to monitor the position of the bowl. A timing mechanism controls rotation of the bowl and sequentially positions a next cavity under the opening at feeding times that may be set to occur at various time intervals or clock times that may be pre-programmed by a user.

U.S. Patent Publication No. US 2017/0042116 A1 discloses a feeding bowl including a tapering main body having a feeding bowl base and a central opening. The tapering main body has an interior part configured to engage a rotary mechanism and an exterior part configured with a plurality of annular partition walls for delimiting a plurality of (e.g., 7) food compartments, which may be configured as chutes. The tapering shape of the main body allows food to be easily loaded into the food compartments via the central charging opening. The food will move along the inclined upper face of the feeding bowl towards the inner face of the first lid part simply under the influence of gravity. When a food compartment is moved by rotation to the outlet opening, the food is brought along by the partition walls, and optionally by the inner face of the first lid part. At the end of a rotation step, the food is discharged via the outlet simply under the influence of gravity. The main body is rotated by a motor unit of the rotary mechanism. The actuator of the rotation of the main body by may be a spring-biased elongated body having at least a manipulation end positioned in and/or extending through the central opening of the tapering body of the feeding bowl so as to be accessible for the animal from outside the food dispenser either directly or due to the manipulation end being connected to the second lid part. The spring serves to reciprocate the actuator after the animal has pressed the actuator axially towards the base plate to activate the motor unit of the rotary mechanism.

These and other similar pet feeder and pet toys seek to incentivize an animal's extended interaction with the pet feeder or pet toy by dispensing animal food and/or animal treats in response to the animal's interaction with the pet feeder or pet toy. However, in practice, an extended interval of animal interaction with the pet feeder or pet toy may not be achieved for some pet feeders or pet toys, for example, because the pet feeder or pet toy dispenses food or treats too rapidly or in too large a quantity or because the pet feeder or pet toy makes it too difficult for the pet to obtain sufficient reward. As a result, the pet can become disinterested in the pet feeder or pet toy.

BRIEF SUMMARY

In at least some embodiments, a treat dispenser includes a housing having an interior compartment. The housing has an opening formed therein communicating with the compartment. The treat dispenser further includes a turntable within and rotatable with respect to the housing and an actuator coupled to the turntable. The actuator is configured to impart rotation to the turntable based on manipulation of the actuator, such that an animal treat disposed within the compartment and on the turntable is ejected radially from the housing through the opening.

Additional embodiments are disclosed herein.

BRIEF DESCRIPTION OF THE SEVERAL VIEWS OF THE DRAWINGS

In the following discussion, like and corresponding reference numbers are utilized to identify the same or similar elements in various embodiments. Elements are generally identified utilizing three-digit numbers, with the first digit identifying the number of the figure by reference to which the element is first described.

DETAILED DESCRIPTION

Figure 1:
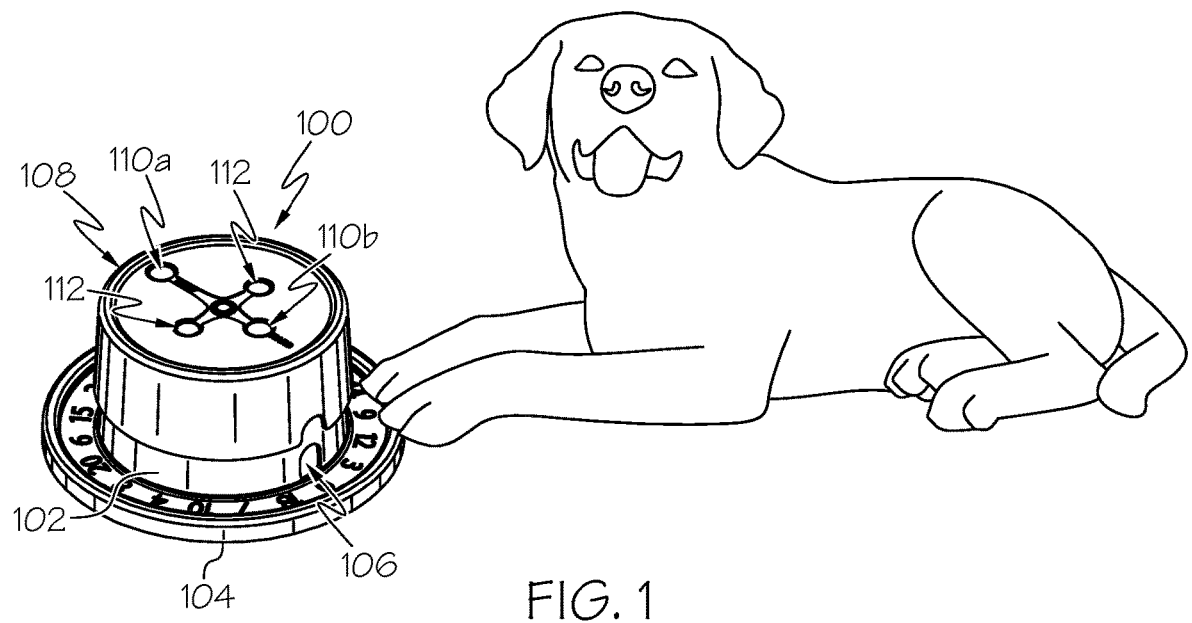
FIG. 1 is an exterior perspective view of a treat dispenser in accordance with one embodiment.
Figure 3:
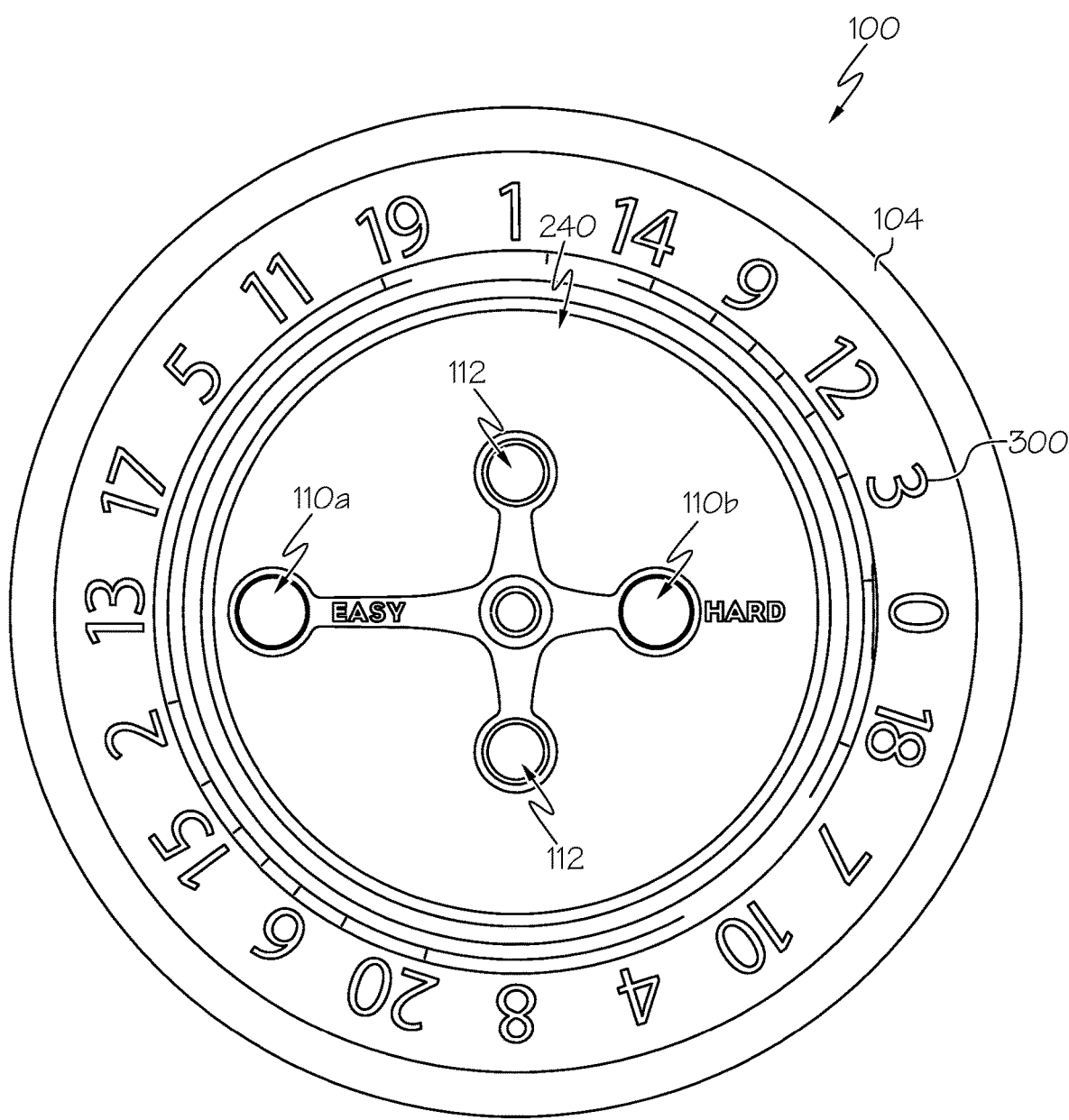
FIG. 3 is a top plan view of a treat dispenser in accordance with one embodiment.

With reference now to the figures and in particular with reference to FIG. 1, there is illustrated an exterior perspective view of a treat dispenser 100 in accordance with one embodiment. Generally, treat dispenser 100 includes at least a housing 102 having at least one interior compartment into which animal treats and/or dry pet food (collectively referred to herein as "animal treats") may be loaded. Housing 102 may in some embodiments have at least one support 104 (e.g., in this embodiment, a circumferential rim) that improves stability of treat dispenser 100 when placed on an underlying substrate, such as the floor or ground. As best seen in the plan view provided in FIG. 3, support 104 may bear indicia, such as number, letters, images, symbols, graphics, or the like. In this example, support 104 has molded therein numerals simulating those found on a roulette wheel. Housing 102 has at least one aperture 106 out of which the animal treats and/or animal food may be dispensed from the interior compartment in response to animal manipulation of an actuator 108, as discussed further herein. As illustrated in FIGS. 1 and 3, treat dispenser 100 may optionally include one or more additional fill holes 110a, 110b through which animal treats may be loaded into the at least one interior compartment of housing 102, as well as one or more optional recesses 112 (e.g., blind holes) into which an attractant (e.g., an animal treat, a dry, liquid, or paste food item, or odorant) may be placed in order to incentivize animal interaction with treat dispenser 100. Although not required, in the depicted embodiment, fill holes 110a, 110b and recesses 112 are both formed in actuator 108. By rewarding animal interaction with treat dispenser 100, treat dispenser 100 decreases animal boredom, stimulates an animal's mental and physical activity, and increases a period of animal engagement with treat dispenser 100.

Figure 2:
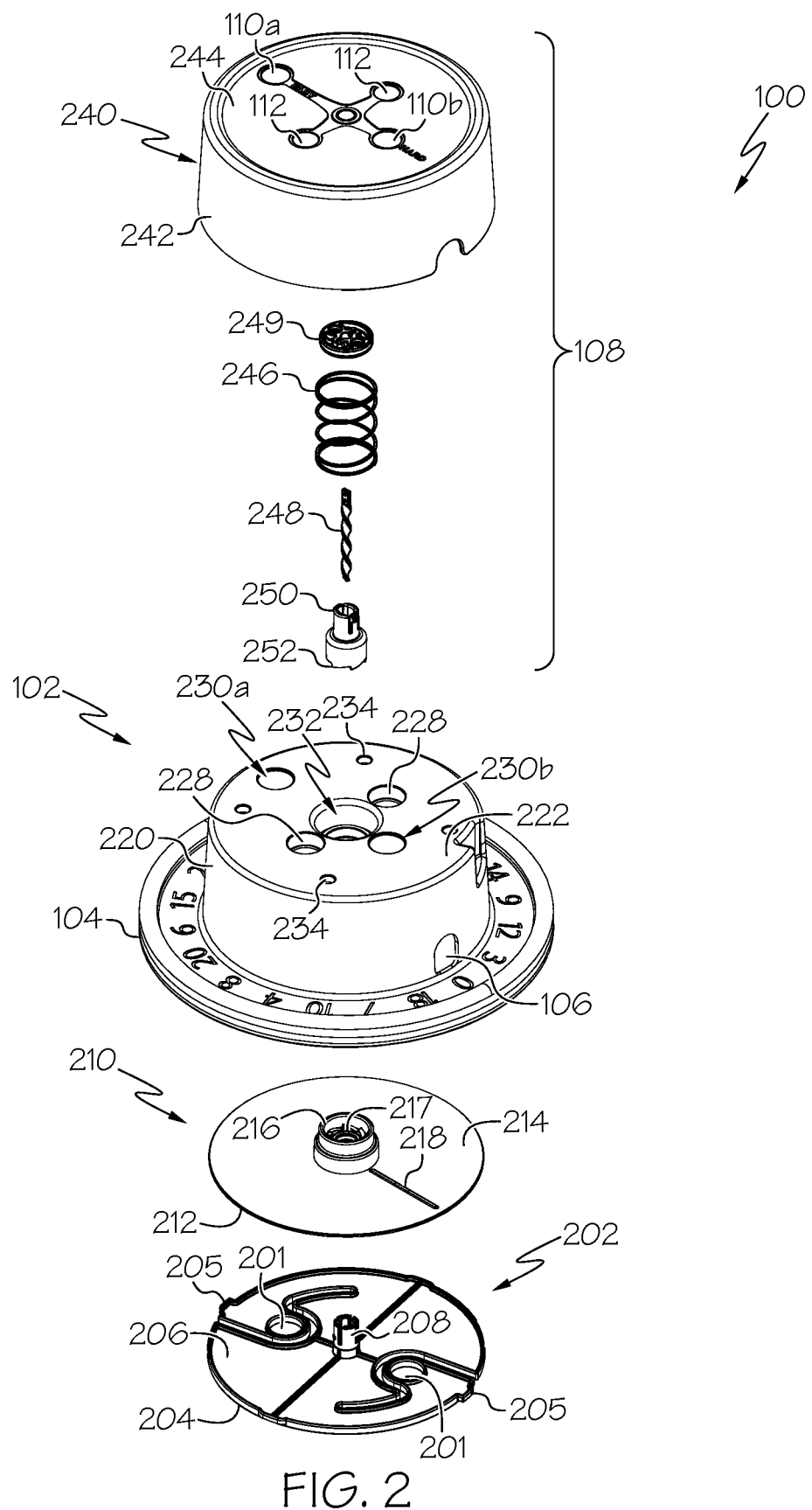
FIG. 2 is an exploded perspective view of a treat dispenser in accordance with one embodiment.
Figure 4:
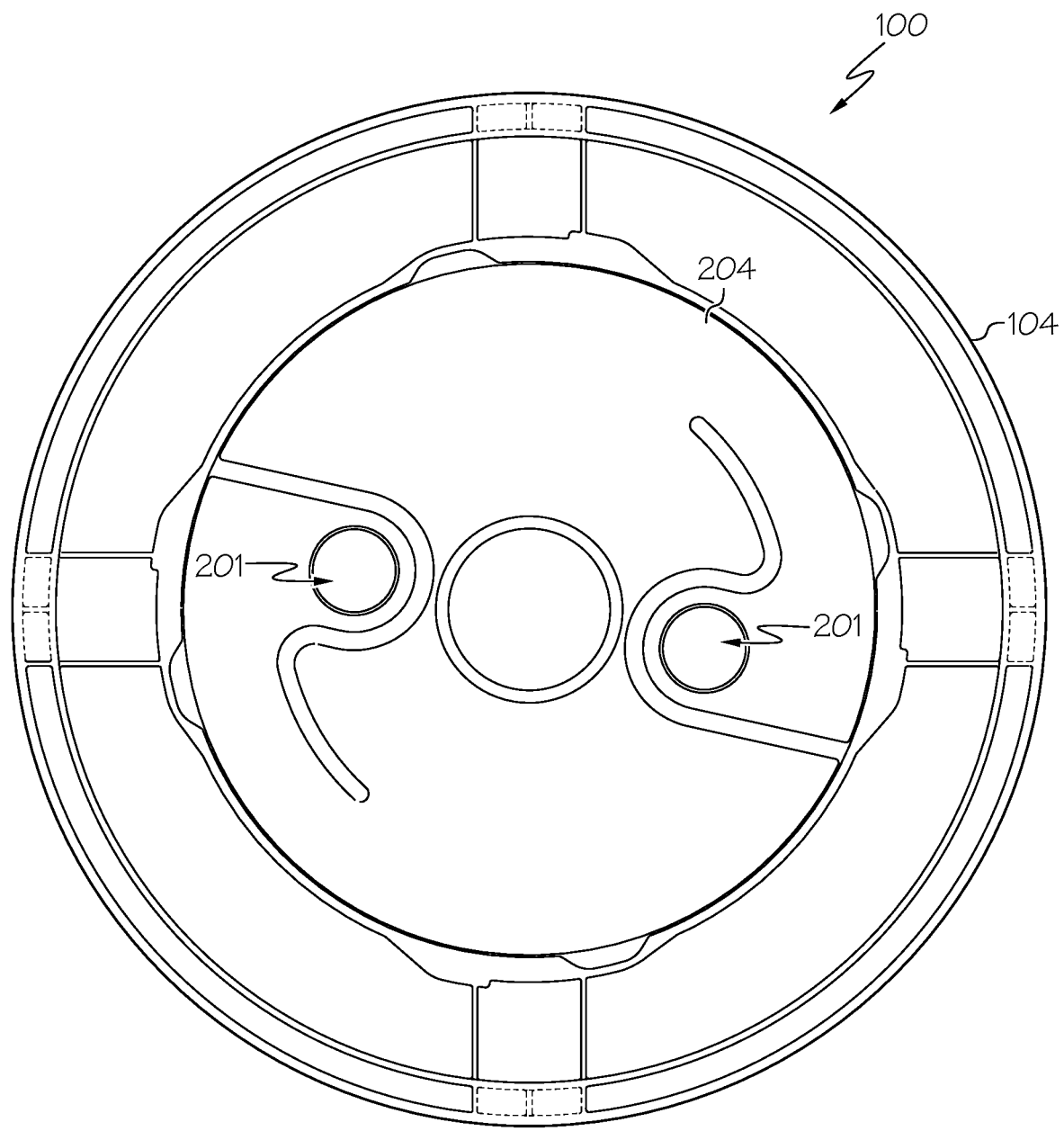
FIG. 4 is a bottom plan view of a treat dispenser in accordance with one embodiment.

As further illustrated in the exploded perspective view given in FIG. 2 and the bottom plan view given in FIG. 4, in some embodiments, treat dispenser 100 further includes a base 202 having an outer surface 204 and an opposing inner surface 206. Inner surface 206 of base 202 has a central axle 208 projecting therefrom. Outer surface 204 is preferably configured to permit the assembled treat dispenser 100 to stably rest on an underlying substrate, such as a floor or the ground. In some embodiments, treat dispenser 200 is configured to discourage detachment of base 202 from housing 102 following initial assembly. In such embodiments, base 202 can be coupled to housing by screws, adhesive, sonic welding, etc. In other embodiments, base 202 can be readily coupled to and decoupled from housing 102 by a human operator, for example, to permit cleaning of, or removal of animal treats from, the interior of housing 102. In such embodiments, base 202 can be assembled to housing, for example, using manually manipulable interlocking structures. In one specific example, base 202 includes one or more tabs 205 extending outwardly from its peripheral edge that can be received within corresponding recesses and slots in housing 102. Base 202 can be secured to housing 102 by placing tabs 205 of base 202 in the recesses of housing 102 and then rotating base 202 with respect to housing 102 to secure tabs 205 in the slots of housing 102. This process can be reversed to remove base 202 from housing 102. As seen in FIGS. 2 and 4, outer surface 204 may optionally have one or more features formed therein (e.g., in this case finger holes 201) to facilitate manual user assembly of base 202 to housing 102 and manual user disassembly of base 202 from housing 102.

Referring again to FIG. 2, treat dispenser 100 additionally includes a turntable 210 having a first surface 212, an opposing second surface 214, and a central hub 216, which in this example extends from second surface 214. Turntable 210 is preferably radially symmetric, and in the depicted example is substantially circular in plan. When turntable 210 is assembled to base 202, hub 216 is rotatably mounted on central axle 208 of base 202 such that turntable 210 freely spins on central axle 208. In preferred embodiments, turntable 210 and base 102 are configured such that when hub 216 is assembled on axle 208 and a load of animal treats are placed on second surface 214, an air gap is retained between first surface 212 of turntable 210 and inner surface 206 of base 202. This spacing between first surface 212 of turntable 210 and inner surface 206 of base 202 can be obtained, for example, by implementing a shoulder of appropriate dimension about axle 208 such that a bearing surface of hub 216 stops against the shoulder. In the depicted embodiment, second surface 214 of turntable 210 is generally planar, but may optionally include one or more raised features or projections 218 to promote rotational movement of treats resting on second surface 214 in concert with the rotation of turntable 210 rather than inertial sliding. In the depicted example, projection 218 is implemented as a raised ridge extending radially from hub 216 substantially to an outer edge of second surface 214.

In the depicted embodiment, housing 102 has a substantially cylindrical or frusto-conical central body 220 that tapers slightly as it extends from support 104. Central body 220 has an end cap 222 in which one or more fill holes 230a, 230b communicating with fill holes 110a, 110b are formed. End cap 222 may additionally include one or more recesses 228 corresponding in location to, and sized to receive therein, the walls defining recesses 112. End cap 222 has a central well 232 defined by at least one sidewall, and at a furthest extent of well 232, a well plate having a gear collar formed there through. As further shown in FIG. 2, end cap 222 may optionally additionally have one or more (and in this example, four) post holes 234 formed therein, with each post hole 234 configured to receive there through a corresponding guide post of actuator 108, as discussed further below with reference to FIG. 6.

In the depicted embodiment, actuator 108 includes a button 240 that is manipulable by a pet to cause one or more treats to be dispensed by treat dispenser 100 via opening 106 of housing 102. In the illustrated embodiment, button 240 includes at least one sidewall 242 and a upper surface 244 defining an interior volume that is generally sized and configured to receive therein at least a portion of central body 220 of housing 102. In this example, button 240, like central body 220 of housing 102, has a substantially cylindrical or frusto-conical form. When assembled to housing 102, button 240 is coupled to housing, for example, by one or more fasteners (e.g., screws) as discussed further below. When so assembled, button 240 is configured to be linearly translated between an unactuated state (as shown in FIG. 1) in which button 240 is extended away from housing 102 a maximum distance and an actuated state in which button 240 is fully depressed toward housing 102. Button 240 is urged toward its unactuated state and, if released from its actuated state, returned to its unactuated state by a spring 246 supported by the well plate disposed in central well 232 of housing 102.

Actuator 108 additionally includes gearing configured to rotate turntable 210 based on the reciprocating linear translation of button 240 (e.g., by a paw or muzzle of a pet or by a human operator) from the unactuated state toward the actuated state and back to the unactuated state. In the illustrated embodiment, this gearing includes a helical gear 248 that is rigidly coupled to a central portion of the interior surface of button 240 by a mounting plate 249. The gearing additionally includes a rotary drive gear 250 having cogs 252 configured to mesh with teeth 217 of hub 216. When actuator 108 is assembled to housing 102, helical gear 248 passes through and is threadedly coupled by an interior thread to rotary drive gear 250, which is captured for rotation within the gear collar of central well 232. Although in the illustrated embodiment actuator 108 is depicted as converting linear reciprocating motion into rotary motion, those skilled in the art will appreciate that in other embodiments an actuator may instead rotate turntable 202 based upon other actuation motions, including a rotary motion and/or a pivotal motion of the actuator.

Figure 5:
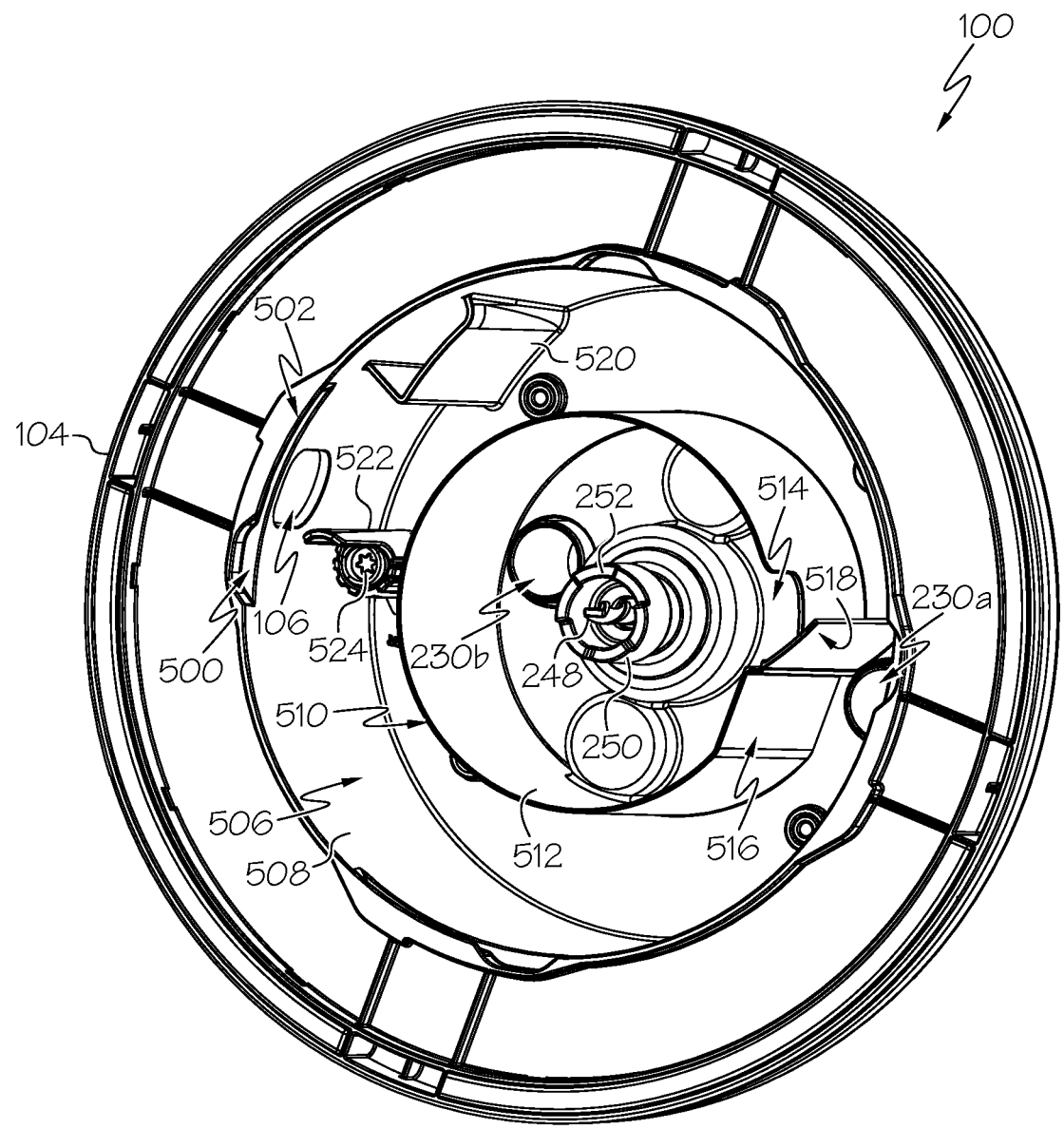
FIG. 5 is an interior perspective view of a treat dispenser in accordance with one embodiment.

With reference now to FIG. 5, there is illustrated an interior perspective view of treat dispenser 100 in accordance with one embodiment. In this view, treat dispenser 100 is illustrated from the side opposite button 242 with base 202 removed. As noted above, in the illustrated embodiment, a human operator can removably couple base 202 to housing 102 by placing each of tabs 205 of base 202 into a corresponding relief area 500 in housing 102 and by then rotating base 202 clockwise with respect to housing 102, for example, with the aid of finger holes 201 in base 202. Tabs 205 will thus be retained within a corresponding slot 502 formed in housing 102 until the human operator rotates base 202 counter-clockwise with respect to housing 102, for example, to empty animal treats from housing 102 and/or to clean the interior of housing 102.

In various embodiments, housing 102 includes one or more interior compartments. In the embodiment specifically depicted in FIG. 5, the interior of housing 102 includes a first compartment 506 bounded by at least one outer wall 508 substantially surrounding first compartment 506. First compartment 506 communicates with an exterior of treat dispenser 100 via aperture 106 in outer wall(s) 508. Outer wall(s) 508, which in this case generally correspond to the form of central body 220 of housing 102, can generally have any desired contour, profile, and cross-sectional shape and are not required to define a generally cylindrical or frusto-conical form, as depicted in FIG. 5.

In the depicted embodiment, housing 102 additionally includes an interior second compartment 510, which, in the embodiment depicted in FIG. 5, is within first compartment 506 and bounded by at least one inner wall 512. If present, second compartment 512 communicates with first compartment 506 via an opening 514 through inner wall 512. Animal treats can be selectively loaded into second compartment 510 via fill hole 230*b* (which communicates with fill hole 110*b* of actuator 108), and can similarly be selectively loaded into first compartment 506 via fill hole 230*a* (which communicates with fill hole 110*a* of actuator 108). As will be appreciated, animal treats loaded into second compartment 510 are less likely to be dispensed from treat dispenser 100 in response to actuation of actuator 108 than animal treats loaded into first compartment 506, as animal treats loaded into second compartment 510 must first be ejected from second compartment 510 into first compartment 506 prior to being dispensed from first compartment 506 via aperture 106.

In the exemplary embodiment depicted in FIG. 5, second compartment 510 is specially configured to regulate the passage of animal treats and/or animal food items through opening 514. In particular, inner wall 512 defining second compartment 510 includes, adjacent to opening 514, a ramp portion 516 having greater curvature relative to adjacent portions of inner wall 512. As will be appreciated, in the illustrated embodiment, animal treats and/or animal food items placed into first compartment 506 and second compartment 510 generally circulate in a counter-clockwise direction (viewed from the given perspective) in response to actuation of actuator 108. Based on their inertia, animal treats or animal food items naturally tend to distribute themselves and move with little relative movement along inner wall 512 and/or outer wall 508. Ramp portion 516 serves to interrupt the smooth transport of animal treats and/or animal food items along inner wall 512 by causing the animal treats and/or animal food items to congregate and/or collide adjacent ramp portion 516, increasing a probability of ejection of one or more animal treats and/or animal food items from second compartment 510 via opening 514. A baffle 518 adjacent opening 514 that extends from inner wall 512 into first compartment 506 decreases a probability that any animal treats within first compartment 506 will enter second compartment 510 via opening 514.

In the exemplary embodiment of housing 102 shown in FIG. 5, first compartment 506 is similarly specially configured to regulate the dispensing of animal treats and/or animal food items from first compartment 506 through aperture 106. In this example, outer wall 508 includes a projection 520 adjacent aperture 106 and preceding opening 106 along a path of travel of animal treats in first compartment 506. In the depicted embodiment, projection 520 takes the form of a ramp of generally increasing projection (and/or curvature) into first compartment 506 at portions closer to aperture 106. Like ramp portion 516 of inner wall 512, projection 520 serves to interrupt an inertial path of travel of animal treats along outer wall 508 of first compartment 506. As the inertial path of travel of animal treats is interrupted, animal treats tend to congregate and/or collide, increasing a probability that one or more animal treats may be ejected from treat dispenser 100 via aperture 106. To increase the probability that one or more animal treats within first compartment 506 are, in fact, dispensed from first compartment 506 via aperture 106, treat dispenser 100 optionally, but preferably, further provided with a deflector 522 adjacent aperture 106. In the illustrated embodiment, deflector 522 is positioned following aperture 106 along a path of travel of animal treats within first compartment 506. However, in other examples, deflector 522 may alternatively be positioned substantially in radial alignment with aperture 106 or preceding aperture 106 along the path of travel of animal treats within first compartment 506. In some embodiments, deflector 522 can be coupled to housing 102, and in some embodiments the position and/or orientation of deflector 522 can be user-selectable in order to increase or decrease the probability an animal treat is ejected from treat dispenser 100 via aperture 106 in response to an actuation of actuator 108. For example, in the depicted embodiment, a human operator may selectively rotate deflector 522 in order to adjust an angle of deflector 522 relative to the travel path of animal treats using an adjustment mechanism, such as screw 524.

Figure 6:
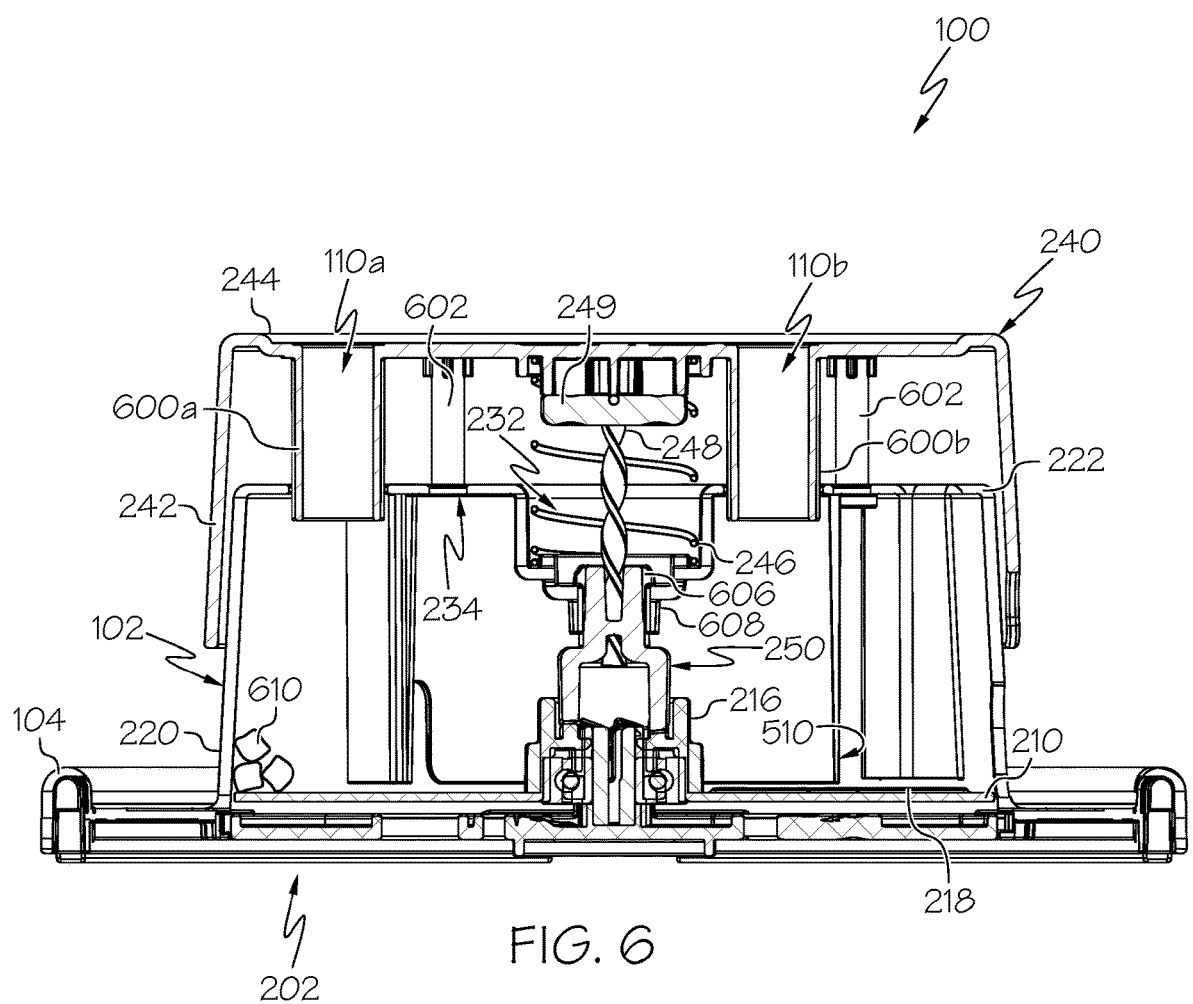
FIG. 6 is a section view of a treat dispenser in accordance with one embodiment.

Referring now to FIG. 6, there is depicted a section view of a treat dispenser 100 in an unactuated state in accordance with one embodiment. In the embodiment of FIG. 6, an actuator 108 and a base 202 to which a turntable 210 is coupled are assembled to housing 102. In this example, fill holes 110a, 110b in button 240 communicate with fill holes 230a, 230b of end cap 222 via fill tubes 600a, 600b, respectively. Fill tubes 600a, 600b ensure that animal treats do not enter the space between button 240 and housing 102. In addition, one or more guide posts 602 of button 240 are assembled through one or more corresponding post holes 234 in end cap 222 of housing 102. In some embodiments, guide posts 602 are retained in post holes 234 following assembly of button 240 to housing 102 by the insertion of screws (optionally in combination with washers) having a greater dimension than post holes 234 into the ends of guide posts 602.

FIG. 6 further illustrates the gearing utilized to rotate turntable 214 in response to actuation of actuator 108 in accordance with one embodiment. In particular, helical gear 248 is coupled to button 240 by mounting plate 249, which may be attached to button 240, for example, by screws or other fasteners. Rotary drive gear 250 is threadedly received on helical gear 248 and is also captured within gear collar 608 for rotation therein. In this example, rotary drive gear 250 is retained within gear collar 608 by one or more ears 606, which may be elastically deformed (e.g., by manual force alone) to enable rotary drive gear 250 to be installed within gear collar 608. When rotary drive gear 250 is installed in gear collar 608, cogs 252 of rotary drive gear 250 mesh with corresponding teeth 217 within hub 216 of turntable 210.

In order to use treat dispenser 100, a human operator can load one or more animal treats 610 within one or more interior compartments of housing 102, for example, via fill holes 110a, 110b (if present) and/or aperture 106. The human operator can also optionally place an attractant on treat dispenser 100, for example, within one or more recesses 112, in order to incentivize animal interaction with treat dispenser 100. The human operator can then provide the loaded treat dispenser 100 to a pet, for example, by placing the loaded treat dispenser 100 on the floor or ground.

The human operator may optionally train a pet, such as a dog, to actuate actuator 240, for example, by reinforcing this behavior through the direct provision by the human operator of a treat or other reinforcement (e.g., a click from a training clicker). The pet's actuation of actuator 108 will, of course, be further reinforced by the random dispensing of one or more treats 610 from treat dispenser via aperture 106. Specifically, actuation (e.g., depression) of button 240, for example, by a paw or muzzle of the pet, will cause helical gear 248 to be driven downward through the threaded interior of rotary drive gear 250. As a result, rotary drive gear 250 will rotate within gear collar 608 and, through the engagement of cogs 252 and teach 217, rotate turntable 210. As turntable 210 rotates, animal treats 610 resting on turntable will be accelerated through frictional engagement with second surface 214 and/or other animal treats and/or a raised feature (e.g., projection 218) on second surface 214.

As noted above, the inertia of animal treats 610 will cause the treats to generally travel along outer wall 508 or inner wall 512 in the direction of rotation of turntable 210. For some animal treats 610 and for some actuations of actuator 108, this travel path is interrupted by contact of the animal treats 610 with ramp portion 516 of inner wall 512 or projection 520 from outer wall 508 (and/or another animal treat 610). As a result, one or more animal treats 610 may randomly progress from second compartment 510 to first compartment 506 via opening 514 or be ejected from first compartment 506 via aperture 106. As noted above, deflector 522, if present, can be utilized to increase a probability of an animal treat 610 being ejected from treat dispenser 100 via aperture. It should be appreciated that a treat dispenser 100 as described herein does not meter or portion the dispensing of animal treats and that actuation of actuator 108 does not guarantee dispensing of any animal treats 610 whatsoever. The unpredictable nature of treat dispensing as described herein—with a relatively high, but not too high probability—promotes continued pet engagement with treat dispenser 100 without over-dispensing treats.

As has been described, in at least some embodiments, a treat dispenser includes a housing having an interior compartment. The housing has an opening formed therein communicating with the compartment. The treat dispenser further includes a turntable within and rotatable with respect to the housing and an actuator coupled to the turntable. The actuator is configured to impart rotation to the turntable based on manipulation of the actuator, such that an animal treat disposed within the compartment and on the turntable is ejected radially from the housing through the opening.

Various embodiments of the treat dispenser can be made, for example, by injection molding its principal components (e.g., base 202, turntable 210, housing 102, button 240, rotary drive gear 250) from one or more plastics and/or elastomers, as is known in the art. Following production of the components, the components can be assembled, for example, by snap fit, threaded connection, adhesive, sonic welding, and/or with fasteners (e.g., screws).

While various embodiments have been particularly shown and described, it will be understood by those skilled in the art that various changes in form and detail may be made therein without departing from the spirit and scope of the appended claims and these alternate implementations all fall within the scope of the appended claims. Further, features of various of the disclosed embodiments may be combined, as will be appreciated by those skilled in the art. References herein to an embodiment or embodiments do not necessarily refer to the same embodiment or embodiments. The terms "about" or "approximately," when used to modify quantities or ranges, are defined to mean the stated value(s) plus or minus 5%. The term "coupled" is defined to mean attachment or cooperation of members possibly through one or more intermediate members.

What is claimed is:

1. A treat dispenser, comprising:
    a housing having an interior compartment, the housing having an opening formed therein communicating with the compartment;
    a base coupled to the housing, wherein the base includes a central axle;
    a turntable within the housing, wherein the turntable has a central portion mounted on the central axle such that the turntable is rotatable on the central axle with respect to the housing, the turntable having a generally planar surface in a plane of rotation of the turntable; and
    an actuator coupled to the turntable and configured to impart rotation to the turntable with respect to the housing based on manipulation of the actuator, such that an animal treat disposed within the compartment and on the generally planar surface of the turntable is ejected radially from the housing through the opening.

2. The treat dispenser of claim 1, wherein the base is configured to be selectively coupled to and decoupled from the housing.

3. The treat dispenser of claim 1, wherein:
the generally planar surface has at least one raised feature that is configured to co-rotate treats disposed on the generally planar surface with the turntable.

4. The treat dispenser of claim 1, wherein the compartment is bounded by a curved wall.

5. The treat dispenser of claim 4, wherein the curved wall has a projection adjacent the opening.

6. The treat dispenser of claim 1, and further comprising a deflector adjacent the opening.

7. The treat dispenser of claim 6, wherein the deflector is configurable in multiple positions such that a probability of the treat being ejected from the body can be varied.

8. The treat dispenser of claim 1, wherein the actuator includes a button configured for reciprocating linear translation.

9. The treat dispenser of claim 8, wherein the button has a surface overlaying at least a portion of the compartment.

10. The treat dispenser of claim 8, wherein:
the actuator includes a helical gear coupled to the button and a rotary drive gear coupled to the helical gear, the rotary drive gear including at least one cog; and
the turntable includes at least one tooth that engages the at least one cog of the rotary drive gear such that the turntable co-rotates with the rotary drive gear.

11. The treat dispenser of claim 1, wherein:
the compartment is a first compartment;
the opening is a first opening; and
the housing including a second compartment within the first compartment and communicating with the first compartment via a second opening.

12. The treat dispenser of claim 1, wherein the turntable is freely rotatable with respect to the housing.

13. A treat dispenser, comprising:
a housing including at least one wall at least partially defining a compartment, the at least one wall having an opening formed therein;
a turntable within and rotatable with respect to the housing, wherein the turntable includes at least one tooth;
an actuator including a button and gearing, wherein the gearing includes a rotary drive gear having at least one cog that engages the at least one tooth of the turntable, and wherein the gearing is configured to impart rotation to the turntable based on manipulation of the actuator, such that an animal treat disposed on the turntable and within the compartment is ejected radially from the body through the opening.

14. The treat dispenser of claim 13, and further comprising:
a base coupled to the housing, wherein the base includes a central axle and the turntable is mounted on and rotates about the central axle.

15. The treat dispenser of claim 13, wherein:
the turntable includes a surface having at least one raised feature that is configured to co-rotate treats disposed on the surface with the turntable.

16. The treat dispenser of claim 15, wherein the at least one wall has a projection adjacent the opening.

17. The treat dispenser of claim 15, and further comprising a deflector adjacent the opening.

18. The treat dispenser of claim 13, wherein the button is configured for reciprocating linear translation.

19. The treat dispenser of claim 13, wherein:
the housing has an end cap; and
the button covers the end cap.

20. The treat dispenser of claim 13, wherein the turntable is freely rotatable with respect to the housing.

21. The treat dispenser of claim 13, wherein the turntable has a generally planar surface in a plane of rotation of the turntable.

22. A method of dispensing pet treats, comprising:
providing a treat dispenser, including:
a housing having an interior compartment, the housing having an opening formed therein communicating with the compartment;
a base coupled to the housing, wherein the base includes a central axle;
a turntable within the housing, wherein the turntable has a central portion mounted on the central axle such that the turntable is rotatable on the central axle with respect to the housing, the turntable having a generally planar surface in a plane of rotation of the turntable; and
an actuator coupled to the turntable and configured to impart rotation to the turntable with respect to the housing based on manipulation of the actuator, such that an animal treat disposed within the compartment and on the generally planar surface of the turntable is ejected radially from the housing through the opening;
loading the compartment with one or more animal treats; and
placing the treat dispenser on a substrate accessible to a pet.

23. A method of dispensing pet treats, comprising:
providing a treat dispenser, including:
a housing including at least one wall at least partially defining a compartment, the at least one wall having an opening formed therein;
a turntable within and rotatable with respect to the housing, wherein the turntable includes at least one tooth;
an actuator including a button and gearing, wherein the gearing includes a rotary drive gear having at least one cog that engages the at least one tooth of the turntable, and wherein the gearing is configured to impart rotation to the turntable with respect to the housing based on manipulation of the actuator, such that an animal treat disposed on the turntable and within the compartment is ejected radially from the body through the opening;
loading the compartment with one or more animal treats; and
placing the treat dispenser on a substrate accessible to a pet.

* * * * *